United States Patent
Lee et al.

(10) Patent No.: US 10,473,377 B2
(45) Date of Patent: Nov. 12, 2019

(54) HIGH OUTDOOR AMBIENT AND HIGH SUCTION PRESSURE OIL PUMP OUT MITIGATION FOR AIR CONDITIONERS

(71) Applicant: Carrier Corporation, Jupiter, FL (US)

(72) Inventors: Jun Pyo Lee, Zionsville, IN (US);
Sathish R. Das, Indianapolis, IN (US);
Everett Lumpkin, Galveston, IN (US);
Mathew Gervais, Fort Wayne, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 134 days.

(21) Appl. No.: 15/711,504

(22) Filed: Sep. 21, 2017

(65) Prior Publication Data
US 2018/0087816 A1    Mar. 29, 2018

Related U.S. Application Data

(60) Provisional application No. 62/399,662, filed on Sep. 26, 2016.

(51) Int. Cl.
F25B 49/02    (2006.01)

(52) U.S. Cl.
CPC .......... *F25B 49/022* (2013.01); *F25B 49/025* (2013.01); *F25B 2500/07* (2013.01);
(Continued)

(58) Field of Classification Search
CPC .. F25B 49/022; F25B 49/025; F25B 2500/07; F25B 2500/08; F25B 2500/16;
(Continued)

(56) References Cited

U.S. PATENT DOCUMENTS 5,067,326 A    11/1991   Alsenz
5,632,156 A *  5/1997   Takeo ................. B60H 1/3205
                                              62/160
(Continued)

FOREIGN PATENT DOCUMENTS

EP    2375192 A2    10/2011

OTHER PUBLICATIONS

Emerson Climate Technologies, "Understanding Compressor Modulation in Air Conditioning Applications", 2014, available at:http://www.emersonclimate.com/Documents/Products/Compressors/ebooks/019383-CompsrMdltn-eBook_v2.pdf, 60pgs.

*Primary Examiner* — Jonathan Bradford
(74) *Attorney, Agent, or Firm* — Cantor Colburn LLP

(57) ABSTRACT

A method of operating an air conditioning system including: operating a refrigerant compression device at a demand speed to circulate refrigerant through a refrigeration circuit; monitoring, using a temperature sensor, a temperature of external ambient air; monitoring, using a pressure sensor, a pressure of the refrigerant within the refrigerant circuit; detecting, using a controller, when the temperature of external ambient air is greater than a selected temperature; detecting, using the controller, when the pressure of the refrigerant is greater than a selected pressure; and reducing the speed of the refrigerant compression device to a selected speed for a first duration of time when the temperature of external ambient air is greater than the selected temperature and the pressure of the refrigerant is greater than the selected pressure.

18 Claims, 3 Drawing Sheets

(52) U.S. Cl.
CPC ....... *F25B 2500/08* (2013.01); *F25B 2500/16* (2013.01); *F25B 2600/0253* (2013.01); *F25B 2700/171* (2013.01); *F25B 2700/193* (2013.01); *F25B 2700/1933* (2013.01); *F25B 2700/2106* (2013.01); *Y02B 30/741* (2013.01)

(58) Field of Classification Search
CPC ...... F25B 2600/0253; F25B 2700/1933; F25B 2700/2106; Y02B 30/741
See application file for complete search history.

(56) References Cited

U.S. PATENT DOCUMENTS

| | | |
|---|---|---|
| 6,216,474 B1 | 4/2001 | Sishtla |
| 7,137,265 B2 | 11/2006 | Kim |
| 7,854,137 B2 | 12/2010 | Lifson et al. |
| 8,672,642 B2 | 3/2014 | Tolbert, Jr. et al. |
| 8,708,661 B2 | 4/2014 | Lee et al. |
| 8,974,190 B2 | 3/2015 | Bonnefoi et al. |
| 2004/0112679 A1 | 6/2004 | Centers |
| 2008/0134701 A1 | 6/2008 | Christensen et al. |
| 2008/0279708 A1 | 11/2008 | Heimonen et al. |
| 2010/0050673 A1 | 3/2010 | Hahn |
| 2011/0011125 A1* | 1/2011 | Kasahara ................ F25B 13/00 62/498 |
| 2013/0136622 A1 | 5/2013 | De Bernardi et al. |
| 2014/0056727 A1 | 2/2014 | Koyama et al. |

* cited by examiner

HIGH OUTDOOR AMBIENT AND HIGH SUCTION PRESSURE OIL PUMP OUT MITIGATION FOR AIR CONDITIONERS

CROSS-REFERENCE TO RELATED APPLICATIONS

This application claims the benefit of U.S. provisional patent application Ser. No. 62/399,662, filed Sep. 26, 2016, the entire contents of which are incorporated herein by reference.

BACKGROUND OF THE DISCLOSURE

The embodiments herein generally relate to air conditioning systems and more specifically, the control systems of such air conditioning systems.

Air conditioning systems are commonly used to cool enclosed environments, such as, for example, a house, a building, and a vehicle. An air conditioning system is typically in operative association with an enclosed conditioning space and maintains a controlled temperature environment within the enclosed conditioning space.

Conventionally, the air conditioning system has a refrigerant compression device, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the enclosed conditioning space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the enclosed conditioning space.

Simultaneously elevated temperatures inside and outside the enclosed conditioning space may lead to high suction pressure at an inlet of the refrigerant compression device, which may cause the refrigerant compression device to excessively migrate oil within the refrigerant compression device. Increased discharge of oil is undesirable as it may shorten the overall life of the refrigerant compression device and may also lead to a failure of the bearings within the refrigerant compression device. A system to prevent excessive oil migration within the refrigerant compression device during simultaneously elevated temperatures inside and outside the enclosed conditioning space is desired.

BRIEF DESCRIPTION OF THE DISCLOSURE

According to one embodiment, a method of operating an air conditioning system is provided. The method includes: operating a refrigerant compression device at a demand speed to circulate refrigerant through a refrigeration circuit; monitoring, using a temperature sensor, a temperature of external ambient air; monitoring, using a pressure sensor, a pressure of the refrigerant within the refrigerant circuit; detecting, using a controller, when the temperature of external ambient air is greater than a selected temperature; detecting, using the controller, when the pressure of the refrigerant is greater than a selected pressure; and reducing the speed of the refrigerant compression device to a selected speed for a first duration of time when the temperature of external ambient air is greater than the selected temperature and the pressure of the refrigerant is greater than the selected pressure.

In addition to one or more of the features described above, or as an alternative, further embodiments of the method may include increasing the speed of the refrigerant compression device by a selected speed increment after reducing the speed of the refrigerant compression device when the temperature of external ambient air is greater than the selected temperature and the pressure of the refrigerant is greater than the selected pressure.

In addition to one or more of the features described above, or as an alternative, further embodiments of the method may include: detecting, using the controller, when the pressure of the refrigerant is greater than a designated pressure associated with the speed of the refrigerant compression device; and decreasing the speed of the refrigerant compression device by a second selected speed increment when the pressure of the refrigerant is greater than the designated pressure associated with the speed of the refrigerant compression device.

In addition to one or more of the features described above, or as an alternative, further embodiments of the method may include: detecting, using the controller, when the pressure of the refrigerant is less than a designated pressure associated with the speed of the refrigerant compression device; detecting, using the controller, if the speed of the refrigerant compression device is greater than or equal to the demand speed; and increasing the speed of the refrigerant compression device by the selected speed increment when the pressure of the refrigerant is less than the designated pressure associated with the speed of the refrigerant compression device and the speed of the refrigerant compression device is less than the demand speed.

In addition to one or more of the features described above, or as an alternative, further embodiments of the method may include operating the refrigerant compression device at the demand speed if the speed of the refrigerant compression device is greater than or equal to the demand speed.

In addition to one or more of the features described above, or as an alternative, further embodiments of the method may include: storing, using the controller, a benchmark pressure; detecting, using the controller, if the pressure is greater than or equal to a second selected pressure; detecting, using the controller, if the speed of the refrigerant compression device is greater than or equal to the demand speed; detecting, using the controller, when the pressure has decreased by at least a third selected pressure from the benchmark pressure; and increasing the speed of the refrigerant compression device by the selected speed increment when the pressure of the refrigerant pressure has decreased by at least a third selected pressure from the benchmark pressure and the speed of the refrigerant compression device is less than the demand speed.

According to another embodiment a controller of an air conditioning system is provided. The controller including: a processor; a memory comprising computer-executable instructions that, when executed by the processor, cause the processor to perform operations. The operations including: operating a refrigerant compression device at a demand speed to circulate refrigerant through a refrigeration circuit; monitoring a temperature of external ambient air; monitoring a pressure of the refrigerant within the refrigerant circuit; detecting when the temperature of external ambient air is greater than a selected temperature; detecting when the pressure of the refrigerant is greater than a selected pressure; and reducing the speed of the refrigerant compression device to a selected speed for a first duration of time when the temperature of external ambient air is greater than the selected temperature and the pressure of the refrigerant is greater than the selected pressure.

In addition to one or more of the features described above, or as an alternative, further embodiments of the controller may include the operations further include: increasing the speed of the refrigerant compression device by a selected speed increment after reducing the speed of the refrigerant compression device when the temperature of external ambient air is greater than the selected temperature and the pressure of the refrigerant is greater than the selected pressure.

In addition to one or more of the features described above, or as an alternative, further embodiments of the controller may include that wherein the operations further include: detecting when the pressure of the refrigerant is greater than a designated pressure associated with the speed of the refrigerant compression device; and decreasing the speed of the refrigerant compression device by a second selected speed increment when the pressure of the refrigerant is greater than the designated pressure associated with the speed of the refrigerant compression device.

In addition to one or more of the features described above, or as an alternative, further embodiments of the controller may include that the operations further include: detecting when the pressure of the refrigerant is less than a designated pressure associated with the speed of the refrigerant compression device; detecting, using the controller, if the speed of the refrigerant compression device is greater than or equal to the demand speed; and increasing the speed of the refrigerant compression device by the selected speed increment when the pressure of the refrigerant is less than the designated pressure associated with the speed of the refrigerant compression device and the speed of the refrigerant compression device is less than the demand speed.

In addition to one or more of the features described above, or as an alternative, further embodiments of the controller may include that the operations further include: operating the refrigerant compression device at the demand speed if the speed of the refrigerant compression device is greater than or equal to the demand speed.

In addition to one or more of the features described above, or as an alternative, further embodiments of the controller may include that the operations further include: storing a benchmark pressure; detecting if the pressure is greater than or equal to a second selected pressure; detecting if the speed of the refrigerant compression device is greater than or equal to the demand speed; detecting when the pressure has decreased by at least a third selected pressure from the benchmark pressure; and increasing the speed of the refrigerant compression device by the selected speed increment when the pressure of the refrigerant pressure has decreased by at least a third selected pressure from the benchmark pressure and the speed of the refrigerant compression device is less than the demand speed.

According to another embodiment, an air conditioning system is provided. The air conditioning system includes: a refrigerant compression device comprising a refrigerant compression device inlet, the refrigerant compression device in fluid communication with a refrigerant heat rejection heat exchanger, an expansion device, and a refrigerant heat absorption heat exchanger to form a refrigerant circuit; wherein the refrigerant compression device is configured to operate at a demand speed to circulate a refrigerant through the refrigerant circuit when operating in a cooling mode; a controller operably coupled to the refrigerant compression device; a temperature sensor operably coupled to the controller, the temperature sensor configured to measure an external ambient air temperature; and a pressure sensor disposed on the refrigerant circuit, the pressure sensor configured to measure a refrigerant pressure; wherein the controller is configured to reduce the speed of the refrigerant compression device to a selected speed for a first duration of time when the external ambient air temperature is greater than a selected temperature and the refrigerant pressure is greater than a selected pressure.

In addition to one or more of the features described above, or as an alternative, further embodiments of the air conditioning system may include that the controller is configured to increase the speed of the refrigerant compression device by a selected speed increment after reducing the speed of the refrigerant compression device when the temperature of external ambient air is greater than the selected temperature and the pressure of the refrigerant is greater than the selected pressure.

In addition to one or more of the features described above, or as an alternative, further embodiments of the air conditioning system may include that the controller is configured to detect when the pressure of the refrigerant is greater than a designated pressure associated with the speed of the refrigerant compression device; and the controller is configured to decrease the speed of the refrigerant compression device by a second selected speed increment when the pressure of the refrigerant is greater than the designated pressure device.

In addition to one or more of the features described above, or as an alternative, further embodiments of the air conditioning system may include that the controller is configured to detect when the pressure of the refrigerant is less than a designated pressure associated with the speed of the refrigerant compression device; the controller is configured to detect when the speed of the refrigerant compression device is greater than or equal to the demand speed; and the controller is configured to increase the speed of the refrigerant compression device by the selected speed increment when the pressure of the refrigerant is less than the designated pressure associated with the speed of the refrigerant compression device and the speed of the refrigerant compression device is less than the demand speed.

In addition to one or more of the features described above, or as an alternative, further embodiments of the air conditioning system may include that the refrigerant compression device is configured to operate at the demand speed if the speed of the refrigerant compression device is greater than or equal to the demand speed.

In addition to one or more of the features described above, or as an alternative, further embodiments of the air conditioning system may include that the controller is configured to store a benchmark pressure; the controller is configured to detect if the pressure is greater than or equal to a second selected pressure; the controller is configured to detect if the speed of the refrigerant compression device is greater than or equal to the demand speed; the controller is configured to detect when the pressure has decreased by at least a third selected pressure from the benchmark pressure; and the controller is configured to increase the speed of the refrigerant compression device by the selected speed increment when the pressure of the refrigerant pressure has decreased by at least a third selected pressure from the benchmark pressure and the speed of the refrigerant compression device is less than the demand speed.

Technical effects of embodiments of the present disclosure include a monitoring the temperature outside an enclosed conditioning space and the pressure at an inlet of a refrigerant compression device and adjusting the speed of the refrigerant compression device in response to the temperature outside the enclosed conditioning space and the pressure at the inlet of a refrigerant compression device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
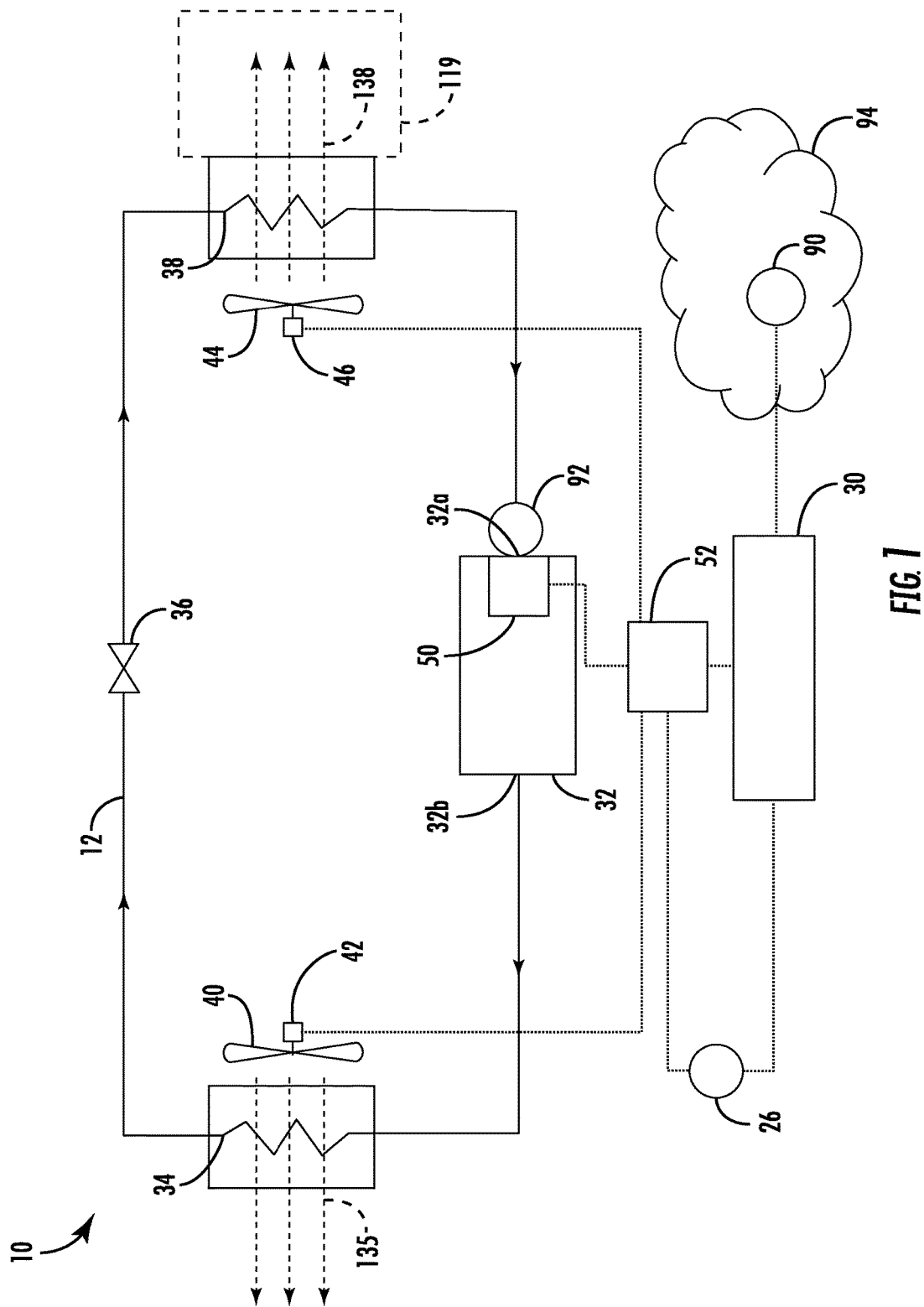
FIG. 1 is a schematic illustration of an air conditioning system, according to an embodiment of the present disclosure.

Referring to FIG. 1, which shows a schematic illustration of an air conditioning system 10, according to an embodiment of the present disclosure. As may be appreciated by one of skill in the art, the embodiments disclosed herein may be utilized in similar heat removal mechanisms, such as, for example a heat pump. The air conditioning system 10 circulates refrigerant through a refrigeration circuit 12. As seen in FIG. 1, the air conditioning system 10 includes a refrigerant compression device 32, a refrigerant heat rejection heat exchanger 34, an expansion device 36, and a refrigerant heat absorption heat exchanger 38 connected in refrigerant flow communication in the closed loop refrigerant circuit 12 and arranged in a conventional refrigeration cycle. The air conditioning system 10 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The air conditioning system 10 functions, under the control of the controller 30, to establish and regulate a desired environmental parameters, such as, for example temperature, humidity, and other conditions in an enclosed conditioning space 119, as known to one of ordinary skill in the art. It is to be understood that other components (not shown) may be incorporated into the refrigeration circuit 12 as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air 135 across the tubes of the refrigerant heat rejection heat exchanger 34 to cool refrigerant vapor passing through the tubes. As may be appreciated by one of skill in the art, the embodiments disclosed herein may also be applicable to geothermal heat transfer and thus the refrigerant heat rejection heat exchanger 34 may reject heat via refrigerant tubes in the earth and not by operatively passing air 135 across the tubes of the refrigerant heat rejection heat exchanger 34, as described above. The refrigerant heat rejection heat exchanger 34 may operate either as a refrigerant condenser, such as if the air conditioning system 10 is operating in a subcritical refrigerant cycle or as a refrigerant gas cooler, such as if the air conditioning system 10 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air 138 across the tubes of the refrigerant heat absorption heat exchanger 38 to heat and evaporate refrigerant liquid passing through the tubes and cool the air. The air 138 cooled in traversing the refrigerant heat rejection heat exchanger 38 is supplied to the enclosed conditioning space 119. The air 138 may be pulled from either internal to the enclosed conditioning space 119 or external to the enclosed conditioning space 119 and blown across the refrigerant heat absorption heat exchanger 38.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32. The electric drive motor 50 may be powered by an external power source 26.

The air conditioning system 10 has a plurality of power demanded loads, including, but not limited to, the drive motor 42 for the fan 40 associated with the refrigerant heat rejection heat exchanger 34, and the drive motor 46 for the fan 44 associated with the refrigerant heat absorption heat exchanger 38. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the external power source 26 as appropriate.

The air conditioning system 10 also includes a controller 30 configured for controlling the operation of the air conditioning system 10 to provide and maintain a desired thermal environment within the enclosed conditioning space 119. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The air conditioning system 10 also includes a temperature sensor 90 located external to the enclosed conditioning space 119. The temperature sensor 90 is configured to measure a temperature of external ambient air 94. The external ambient air 94 is air that is external to the enclosed conditioning space 119. The air conditioning system 10 pulls in external ambient air 94, using the fan 40 and then blows the air 135 over the refrigerant heat rejection heat exchanger 34 to remove heat from the refrigerant. The air conditioning system 10 also includes a pressure sensor 92 located proximate an inlet 32a of the refrigerant compression device 32. The pressure sensor 92 is configured to measure a pressure of the refrigerant flowing into the refrigerant compression device 32.

Figure 2:
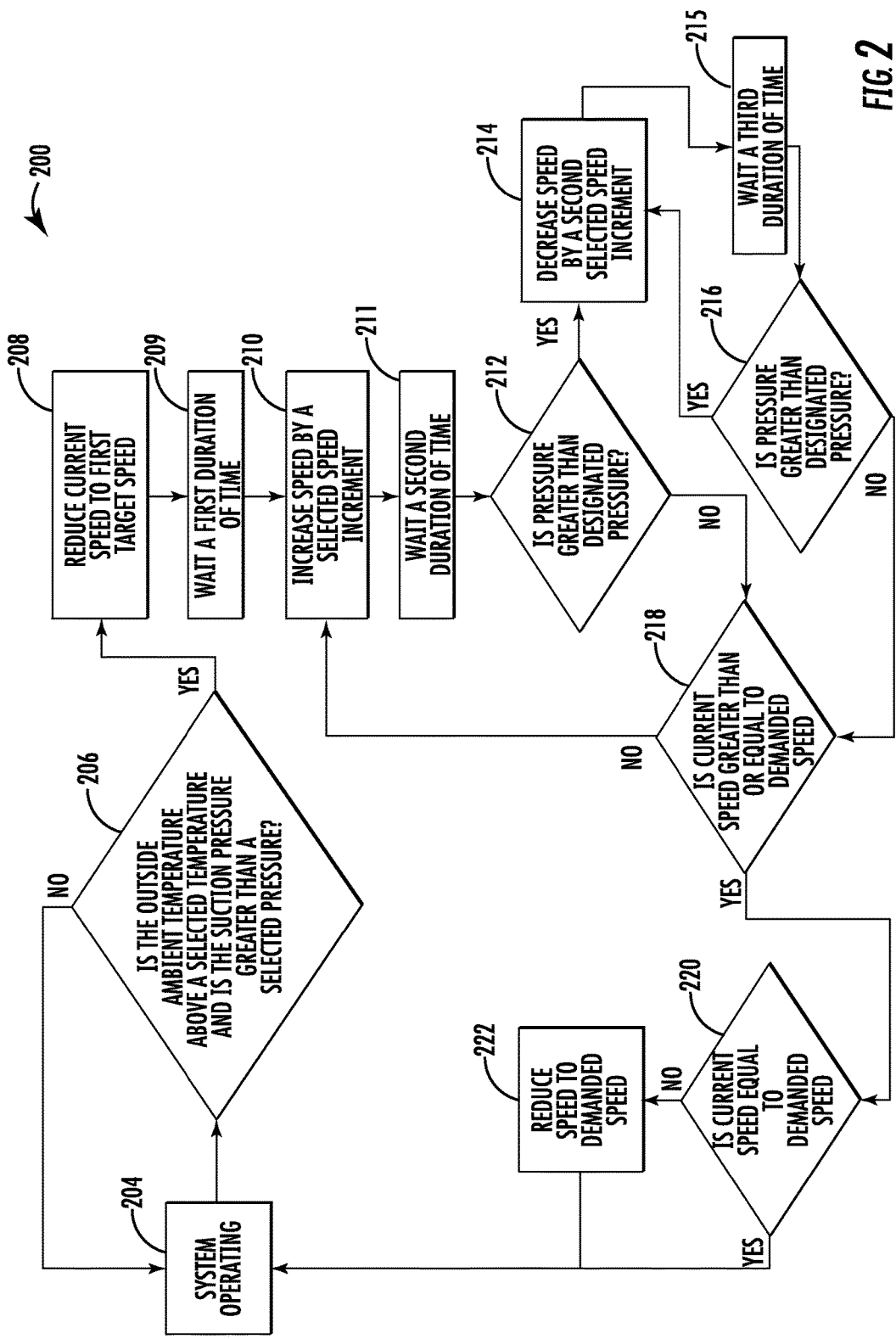
FIG. 2 is a flow diagram illustrating a method for operating the air conditioning system of FIG. 1, according to an embodiment of the present disclosure.

Referring now to FIG. 2, while referencing components of the air conditioning system 10 of FIG. 1. FIG. 2 shows a flow diagram illustrating a method 200 for operating the air conditioning system 10 of FIG. 1, according to an embodiment of the present disclosure. The method 200 begins at block 204, when the air conditioning system 10 is operating normally. During operation at block 204, the air conditioning system 10 is cooling the enclosed conditioning space 119 by circulating the refrigerant through the refrigeration circuit 12 of the air conditioning system 10 using the refrigerant compression device 32. During normal operation, the refrigerant compression device 32 operates at a variety of different speeds, including but not limited to start up, ramping up, ramping down, and a demanded speed. The demanded speed may be associated with the desired output of the refrigerant compression device 32. The refrigerant compression device 32 has a refrigerant compression device inlet 32a and a refrigerant outlet 32b. Refrigerant enters the refrigerant compression device 32 through the refrigerant compression device inlet 32a and exits through the refrigerant outlet 32b. At block 206, the temperature sensor 90 monitors the temperature of the external ambient air 94 located external to the enclosed conditioning space 119. Also at block 206, the pressure sensor 92 monitors the pressure of the refrigerant within the refrigerant circuit 12. In an embodiment, the pressure sensor 92 monitors the pressure of the refrigerant located proximate to the refrigerant compression device inlet 32a (i.e. suction pressure). At block 206, when the temperature sensor 90 detects that the temperature of external ambient air 94 is greater than a selected temperature and the pressure of the refrigerant is greater than a selected pressure, the controller 30 will reduce the speed of the refrigerant compression device 32 at block 208 and then wait for a first duration of time at block 209. In an embodiment, the first duration of time may be between about fifteen to thirty seconds. In an embodiment, the speed is reduced to a first target speed. The first target speed may be a startup speed of the refrigerant compression device 32. The target speed may also be referred to as a selected speed. Advantageously, by reducing the speed of the refrigerant compression device 32 when the refrigerant pressure is above the selected pressure and the temperature of external ambient air 94 is above the selected temperature, the risk of excessive oil migration by the refrigerant compression device 32 is also reduced. Excessive oil migration is undesirable displacement of oil within the refrigerant compression device 32 by refrigerant. In an embodiment, the selected temperature is about ninety-five degrees Fahrenheit and the selected pressure is about one-hundred and seventy-one pounds per square inch. It will be appreciated that the selected temperature may be greater than or less than ninety-five degrees Fahrenheit. It will further be appreciated that the selected pressure may be greater than or less than about one-hundred and seventy-one pounds per square inch.

Once the speed of the refrigerant compression device 32 has been reduced, the controller 30 will then increase the speed of the refrigerant compression device 32 by a selected speed increment at block 210 and then wait a second duration of time at block 211. In an embodiment, the second duration of time may be between about fifteen to thirty seconds. In one embodiment, for an air conditioning system with a 24000 Btu/hr cooling capacity, speed increases at a speed increment of 164 RPM for every 5 psi decrease in suction pressure that was above 171 psig. In a second embodiment, for an air conditioning system with a 36000 Btu/hr cooling capacity, speed increases at a speed increment of 92 RPM for every 5 psi decrease in suction pressure that was above 171 psig. In a third embodiment, for an air conditioning system with a 48000 Btu/hr cooling capacity, speed increases at a speed increment of 113 RPM for every 5 psi decrease in suction pressure that was above 171 psig. As may be appreciated by one of skill in the art the speed increment may vary for different air conditioning systems having different cooling capacities.

Next at block 212, the controller 30 will then check whether the pressure of the refrigerant is greater than a designated pressure associated with the speed of the refrigerant compression device 32. At block 212, if the pressure of the refrigerant is greater than the designated pressure associated with the speed of the refrigerant compression device 32 then the controller 30 decreases the speed of the refrigerant compression device 32 by a second selected speed increment at block 214 and wait a third duration of time at block 215. In an embodiment, the third duration of time may be between about fifteen to thirty seconds. Then the pressure is rechecked at block 216 to ensure that the pressure is greater than the designated pressure associated with the speed of the refrigerant compression device 32. At block 216, if the pressure is greater than the designated pressure associated with the speed of the refrigerant compression device 32, the method 200 will move back to block 214. At block 216, if the pressure is not greater than the designated pressure associated with the speed of the refrigerant compression device 32, the method 200 will move to block 218. At block 212, if the pressure is not greater than the designated pressure then the method 200 will move onto block 218, where the controller 30 checks whether the speed of the refrigerant compression device 32 is greater than or equal to the demanded speed. The demanded speed may be the speed needed by the refrigerant compression device 32 to provide the demanded cooling for the enclose space 119. At block 218, if the speed of the refrigerant compression device 32 is not greater than or equal to the demanded speed then the method 200 will return to block 210 to increase the speed of the refrigerant compression device 32 by a selected speed increment. At block 218, if the speed of the refrigerant compression device 32 is greater than or equal to the demanded speed then the method 200 will move onto block 220, where the controller 30 checks whether the speed of the refrigerant compression device 32 is equal to the demanded speed. At block 220, if the speed of the refrigerant compression device 32 is equal to the demanded speed then the controller 30 will return the air conditioning system 10 back to normal operation at block 204. At block 220, if the speed of the refrigerant compression device 32 is not equal to the demanded speed then the controller 30 will reduce the speed of the refrigerant compression device 32 to the demanded speed at block 222 and then return the air conditioning system 10 back to normal operation at block 204.

While the above description has described the flow process of FIG. 2 in a particular order, it should be appreciated that unless otherwise specifically required in the attached claims that the ordering of the steps may be varied.

Figure 3:
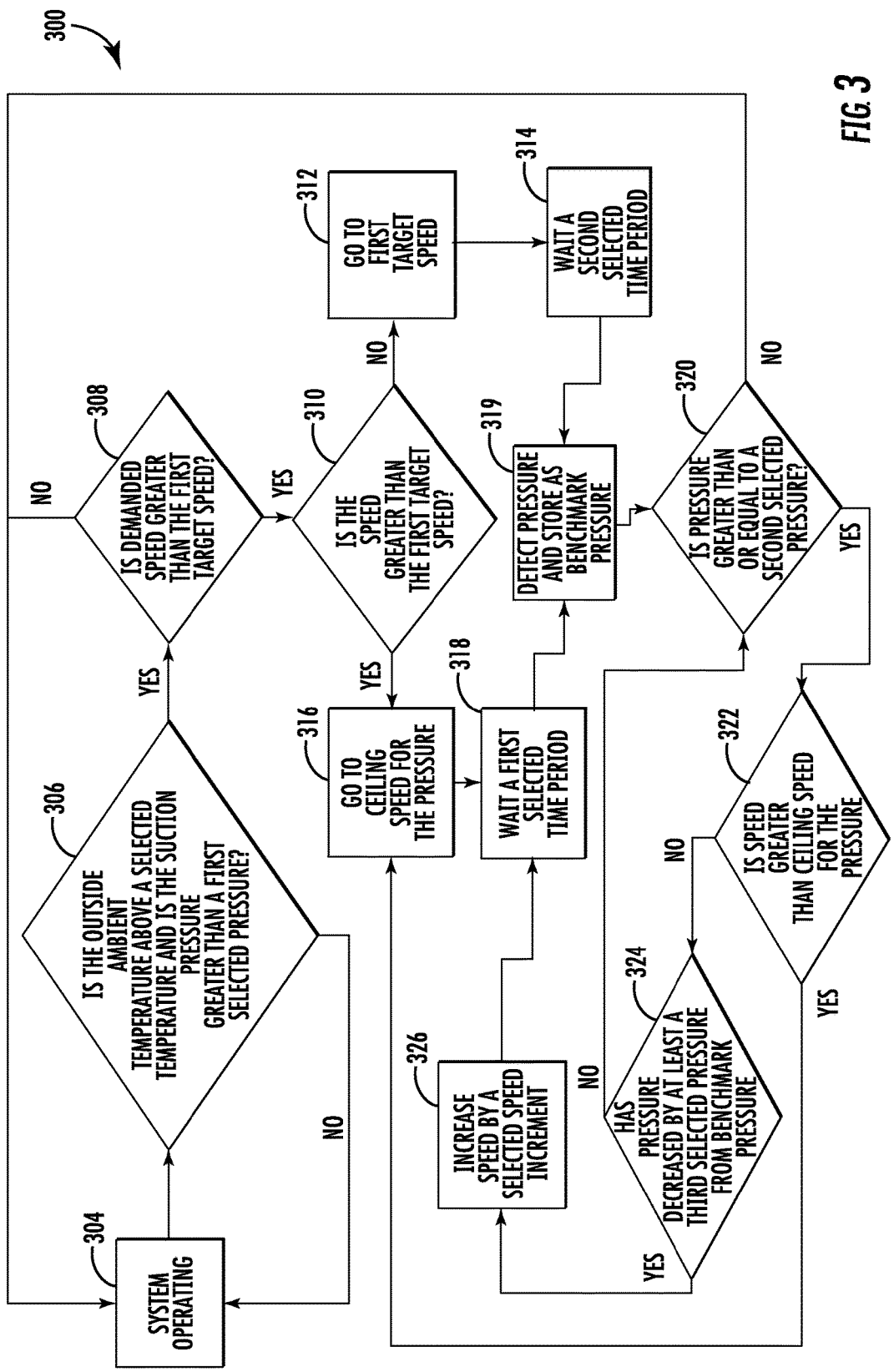
FIG. 3 is a flow diagram illustrating a method for operating the air conditioning system of FIG. 1, according to an embodiment of the present disclosure.

Referring now to FIG. 3, while referencing components of the air conditioning system 10 of FIG. 1. FIG. 3 shows a flow diagram illustrating a method 300 for operating the air conditioning system 10 of FIG. 1, according to an embodiment of the present disclosure. The method 300 begins at block 304, when the air conditioning system 10 is operating normally. During operation at block 304, the air conditioning system 10 is cooling the enclosed conditioning space 119 by circulating the refrigerant through a refrigeration circuit 12 of the air conditioning system 10 using the refrigerant compression device 32. During normal operation, the refrigerant compression device 32 operates at a variety of different speeds, including but is not limited to start up, ramping up, ramping down, and a demanded speed. The demanded speed may be the speed needed by the refrigerant compression device 32 to provide the demanded cooling for the enclose space 119. The refrigerant compression device 32 has a refrigerant compression device inlet 32a and a refrigerant outlet 32b. Refrigerant enters the refrigerant compression device 32 through the refrigerant compression device inlet 32a and exits through the refrigerant outlet 32b. At block 306, the temperature sensor 90 monitors the temperature of the external ambient air 94 located external to the enclosed conditioning space 119. Also at block 306, the pressure sensor 92 monitors the pressure of the refrigerant located proximate to the refrigerant compression device inlet 32a (i.e. suction pressure). At block 306, when the temperature sensor 90 detects that the temperature of external ambient air 94 is greater than a selected temperature and the pressure sensor 92 detects the pressure of the refrigerant is greater than a first selected pressure, the controller 30 checks whether the demanded speed of the refrigerant compression device 32 is greater than the first target speed of the refrigerant compression device 32, at block 308. The first target speed may be a startup speed of the refrigerant compression device 32. The target speed may also be referred to as a selected speed. In an embodiment, the selected temperature is about ninety-five degrees Fahrenheit and the first selected pressure is about one-hundred and seventy-one pounds per square inch. It will be appreciated that the selected temperature may be greater than or less than ninety-five degrees Fahrenheit. It will further be appreciated that the first selected pressure may be greater than or less than about one-hundred and seventy-one pounds per square inch. Advantageously, by reducing the speed of the refrigerant compression device 32 when the refrigerant pressure is above the first selected pressure and the temperature of external ambient air 94 is above the selected temperature, the risk of excessive oil migration by the refrigerant compression device 32 is also reduced. Excessive oil migration is undesirable displacement of oil within the refrigerant compression device 32 by refrigerant At block 308, if the demanded speed of the refrigerant compression device 32 is not greater than the first target speed of the refrigerant compression device 32 then the controller 30 will move the air conditioning system 10 back to normal operations at block 304. At block 308, if the demanded speed of the refrigerant compression device 32 is greater than the first target speed of the refrigerant compression device 32 then the method 300 will move to block 310, and the controller 30 will check whether the current speed of the refrigerant compression device 32 is greater than the first target speed of the refrigerant compression device 32. At block 310, if the current speed of the refrigerant compression device 32 is greater than the first target speed of the refrigerant compression device 32 then the controller 30 will move the refrigerant compression device 32 to the ceiling speed for the measured pressure of the refrigerant within the refrigerant circuit 12 at block 316 and wait a first selected period of time at block 318 until moving on to block 319. The ceiling speed is the maximum allowed speed of the refrigerant compression device 32 based on the current measured pressure of the refrigerant in the refrigerant circuit 12 (e.g. proximate to the compression device inlet 32a). The ceiling speed may be referred to as a selected speed. In an embodiment, the first selected period of time may be about thirty seconds. It will be appreciated that the first selected period of time may be greater than or less than about thirty seconds. At block 310, if the current speed of the refrigerant compression device 32 is not greater than the first target speed of the refrigerant compression device 32 then the controller 30 will operate the refrigerant compression device 32 at the first target speed at block 312 and wait a second selected period of time at block 314 until moving on to block 319. In an embodiment, the second selected period of time may be about fifteen seconds. It will be appreciated that the second selected period of time may greater than or less than about fifteen seconds.

At block 319, the pressure sensor 92 detects the pressure of the refrigerant, in the refrigerant circuit 12, and the controller 30 stores the detected pressure as a benchmark pressure to be utilized later in the method 300. Next at block 320, the controller 30 will check whether the pressure of the refrigerant is less than a second selected pressure, wherein the second selected pressure is less than the first selected pressure. In an embodiment, the second selected pressure may be about one hundred and sixty-eight pounds per square inch. It will be appreciated that the second selected pressure may be greater than or less than about one hundred and sixty-eight pounds per square inch. At block 320, if the pressure of the refrigerant is less than the second selected pressure then the method 300 will move back to block 304 and the air conditioning system 10 will resume normal operation. At block 320, if the pressure of the refrigerant is greater than or equal to the second selected pressure then the method 300 will move to block 322.

At block 322, the controller 30 checks whether the current speed of the refrigerant compression device 32 is greater than the ceiling speed for the measured pressure of the refrigerant within the refrigerant circuit 12. At block 322, if the current speed of the refrigerant compression device 32 is greater than the ceiling speed for the pressure of the refrigerant, within the refrigerant circuit 12, then the controller 30 will move the speed of the refrigerant compression device 32 to the ceiling speed for the measured pressure of the refrigerant at block 316, wait the first selected time period at block 318, and then return to block 319 and block 320. At block 322, if the current speed of the refrigerant compression device 32 is not greater than the ceiling speed for the pressure of the refrigerant, then the controller 30 will check whether the current pressure of the refrigerant has decreased by at least a third selected pressure from the benchmark pressure at block 324. In an embodiment, the third selected pressure may be about five pounds per square inch. It will be appreciated that the third selected pressure may be greater than or less than about five pounds per square inch. At block 324, if the current pressure of the refrigerant has not decreased by at least the third selected pressure then the method 300 will move back to block 320. At block 324, if the pressure of the refrigerant has decreased by at least the third selected pressure then the controller 30 will increase the current speed by a selected speed increment at block 326, wait the first selected time period at block 318, and then return to block 319.

While the above description has described the flow process of FIG. 3 in a particular order, it should be appreciated that unless otherwise specifically required in the attached claims that the ordering of the steps may be varied.

It will be appreciated that controlling the speed of the refrigerant compression device 32 by monitoring the temperature of external ambient air 94 and the pressure of the refrigerant within the refrigerant circuit 12 will reduce the likelihood of excessive oil migration within the refrigerant compression device 32 during simultaneously elevated temperatures within the enclosed conditioning space 119 and outside the enclosed conditioning space 119.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating an air conditioning system, the method comprising:
    operating a refrigerant compressor at a demand speed to circulate refrigerant through a refrigeration circuit;
    monitoring, using a temperature sensor, a temperature of external ambient air;
    monitoring, using a pressure sensor, a pressure of the refrigerant within the refrigerant circuit, wherein the pressure is suction pressure of the refrigerant flowing into the refrigerant compressor;
    detecting, using a controller, when the temperature of external ambient air is greater than a selected temperature;
    detecting, using the controller, when the pressure of the refrigerant is greater than a selected pressure; and
    reducing the speed of the refrigerant compressor to a selected speed for a first duration of time when the temperature of external ambient air is greater than the selected temperature and the pressure of the refrigerant is greater than the selected pressure.

2. The method of claim 1, further comprising:
    increasing the speed of the refrigerant compressor by a selected speed increment after reducing the speed of the refrigerant compression device when the temperature of external ambient air is greater than the selected temperature and the pressure of the refrigerant is greater than the selected pressure.

3. The method of claim 2, further comprising:
    detecting, using the controller, when the pressure of the refrigerant is greater than a designated pressure associated with the speed of the refrigerant compressor; and
    decreasing the speed of the refrigerant compressor by a second selected speed increment when the pressure of the refrigerant is greater than the designated pressure associated with the speed of the refrigerant compressor.

4. The method of claim 2, further comprising:
    detecting, using the controller, when the pressure of the refrigerant is less than a designated pressure associated with the speed of the refrigerant compressor;
    detecting, using the controller, if the speed of the refrigerant compressor is greater than or equal to the demand speed; and
    increasing the speed of the refrigerant compressor by the selected speed increment when the pressure of the refrigerant is less than the designated pressure associated with the speed of the refrigerant compressor and the speed of the refrigerant compressor is less than the demand speed.

5. The method of claim 4, further comprising:
    operating the refrigerant compressor at the demand speed if the speed of the refrigerant compressor is greater than or equal to the demand speed.

6. The method of claim 2, further comprising:
    storing, using the controller, a benchmark pressure;
    detecting, using the controller, if the pressure is greater than or equal to a second selected pressure;
    detecting, using the controller, if the speed of the refrigerant compressor is greater than or equal to the demand speed;
    detecting, using the controller, when the pressure has decreased by at least a third selected pressure from the benchmark pressure; and
    increasing the speed of the refrigerant compressor by the selected speed increment when the pressure of the refrigerant pressure has decreased by at least a third selected pressure from the benchmark pressure and the speed of the refrigerant compressor is less than the demand speed.

7. A controller of an air conditioning system comprising:
    a processor;
    a memory comprising computer-executable instructions that, when executed by the processor, cause the processor to perform operations, the operations comprising:
    operating a refrigerant compressor at a demand speed to circulate refrigerant through a refrigeration circuit;
    monitoring a temperature of external ambient air;
    monitoring a pressure of the refrigerant within the refrigerant circuit;
    detecting when the temperature of external ambient air is greater than a selected temperature;
    detecting when the pressure of the refrigerant is greater than a selected pressure, wherein the pressure is suction pressure of the refrigerant flowing into the refrigerant compressor; and
    reducing the speed of the refrigerant compressor to a selected speed for a first duration of time when the temperature of external ambient air is greater than the selected temperature and the pressure of the refrigerant is greater than the selected pressure.

8. The controller of claim 7, wherein the operations further comprise:
    increasing the speed of the refrigerant compressor by a selected speed increment after reducing the speed of the refrigerant compressor when the temperature of external ambient air is greater than the selected temperature and the pressure of the refrigerant is greater than the selected pressure.

9. The controller of claim 8, wherein the operations further comprise:

detecting when the pressure of the refrigerant is greater than a designated pressure associated with the speed of the refrigerant compressor; and decreasing the speed of the refrigerant compressor by a second selected speed increment when the pressure of the refrigerant is greater than the designated pressure associated with the speed of the refrigerant compression.

10. The controller of claim 8, wherein the operations further comprise:

detecting when the pressure of the refrigerant is less than a designated pressure associated with the speed of the refrigerant compressor;

detecting, using the controller, if the speed of the refrigerant compressor is greater than or equal to the demand speed; and increasing the speed of the refrigerant compressor by the selected speed increment when the pressure of the refrigerant is less than the designated pressure associated with the speed of the refrigerant compressor and the speed of the refrigerant compressor is less than the demand speed.

11. The controller of claim 10, wherein the operations further comprise:

operating the refrigerant compressor at the demand speed if the speed of the refrigerant compressor is greater than or equal to the demand speed.

12. The controller of claim 8, wherein the operations further comprise:

storing a benchmark pressure;

detecting if the pressure is greater than or equal to a second selected pressure;

detecting if the speed of the refrigerant compressor is greater than or equal to the demand speed;

detecting when the pressure has decreased by at least a third selected pressure from the benchmark pressure; and increasing the speed of the refrigerant compressor by the selected speed increment when the pressure of the refrigerant pressure has decreased by at least a third selected pressure from the benchmark pressure and the speed of the refrigerant compressor is less than the demand speed.

13. An air conditioning system comprising:

a refrigerant compressor comprising a refrigerant compressor inlet, the refrigerant compressor in fluid communication with a refrigerant heat rejection heat exchanger, an expansion device, and a refrigerant heat absorption heat exchanger to form a refrigerant circuit;

wherein the refrigerant compressor is configured to operate at a demand speed to circulate a refrigerant through the refrigerant circuit when operating in a cooling mode;

a controller operably coupled to the refrigerant compressor;

a temperature sensor operably coupled to the controller, the temperature sensor configured to measure an external ambient air temperature; and a pressure sensor disposed on the refrigerant circuit, the pressure sensor configured to measure a refrigerant pressure, wherein the refrigerant pressure is suction pressure of the refrigerant flowing into the refrigerant compressor;

wherein the controller is configured to reduce the speed of the refrigerant compressor to a selected speed for a first duration of time when the external ambient air temperature is greater than a selected temperature and the refrigerant pressure is greater than a selected pressure.

14. The air conditioning system of claim 13, wherein:

the controller is configured to increase the speed of the refrigerant compressor by a selected speed increment after reducing the speed of the refrigerant compressor when the temperature of external ambient air is greater than the selected temperature and the pressure of the refrigerant is greater than the selected pressure.

15. The air conditioning system of claim 14, wherein:

the controller is configured to detect when the pressure of the refrigerant is greater than a designated pressure associated with the speed of the refrigerant compressor; and the controller is configured to decrease the speed of the refrigerant compressor by a second selected speed increment when the pressure of the refrigerant is greater than the designated pressure associated with the speed of the refrigerant compressor.

16. The air conditioning system of claim 14, wherein:

the controller is configured to detect when the pressure of the refrigerant is less than a designated pressure associated with the speed of the refrigerant compressor;

the controller is configured to detect when the speed of the refrigerant compressor is greater than or equal to the demand speed; and the controller is configured to increase the speed of the refrigerant compressor by the selected speed increment when the pressure of the refrigerant is less than the designated pressure associated with the speed of the refrigerant compressor and the speed of the refrigerant compressor is less than the demand speed.

17. The air conditioning system of claim 16, wherein:

the refrigerant compressor is configured to operate at the demand speed if the speed of the refrigerant compressor is greater than or equal to the demand speed.

18. The air conditioning system of claim 13, wherein:

the controller is configured to store a benchmark pressure;

the controller is configured to detect if the pressure is greater than or equal to a second selected pressure;

the controller is configured to detect if the speed of the refrigerant compressor is greater than or equal to the demand speed;

the controller is configured to detect when the pressure has decreased by at least a third selected pressure from the benchmark pressure; and the controller is configured to increase the speed of the refrigerant compressor by the selected speed increment when the pressure of the refrigerant pressure has decreased by at least a third selected pressure from the benchmark pressure and the speed of the refrigerant compressor is less than the demand speed.

* * * * *